J. W. DALE.
DRYING APPARATUS.
APPLICATION FILED DEC. 8, 1913.

1,144,817.

Patented June 29, 1915.

Witnesses:
F. A. Bullington
J. A. String

John W. Dale,
Inventor.
By
Fitzenberg,
Attorney.

UNITED STATES PATENT OFFICE.

JOHN W. DALE, OF PORTLAND, OREGON.

DRYING APPARATUS.

1,144,817.

Specification of Letters Patent.

Patented June 29, 1915.

Application filed December 8, 1913. Serial No. 805,235.

*To all whom it may concern:*

Be it known that I, JOHN W. DALE, a citizen of the United States, who resides in the city of Portland, county of Multnomah, and State of Oregon, have invented certain new and useful Improvements in Drying Apparatus, of which the following is a specification.

My invention relates particularly to certain improvements in drying apparatuses, such, for example, as are used for drying lumber and the like, and by means of which improvements the air is so treated in the course of its circulation in the drying kiln that the drying of the lumber is more quickly and effectively accomplished, and, best of all, without causing any checking or cracking of the lumber, which is a very common and serious objection with drying kilns at present used.

My improvement consists in providing in the pipes through which the air passes during its circulation, one or more sprays of water through which the air must pass. These sprays of water within the pipes cause the moisture which has been gathered and is carried by the air in the form of vapor to be instantly condensed by reason of the lower temperature of the water in the spray form. The warm air, charged with moisture from the lumber, actually passes through a substantial spray of water, which water in the liquid form attracts to itself and condenses the moisture in vapor form carried by the air, and leaves the air in a better condition to be reheated for gathering more moisture from the lumber on its next trip. The moisture in the air from the spray makes it possible to increase the temperature of the air very materially and thus hasten the drying process. When hot dry air is passed through the lumber, it causes a checking and cracking. The spray not only serves to properly moisten the air so as to increase its efficiency in carrying heat, and gathering up moisture, but also facilitates the condensation of the moisture thus gathered and carried in the form of vapor.

In order to better explain my discovery, I have shown in the accompanying sheet of drawings a drying kiln in which my invention is embodied, which I will now describe.

Figure 1:
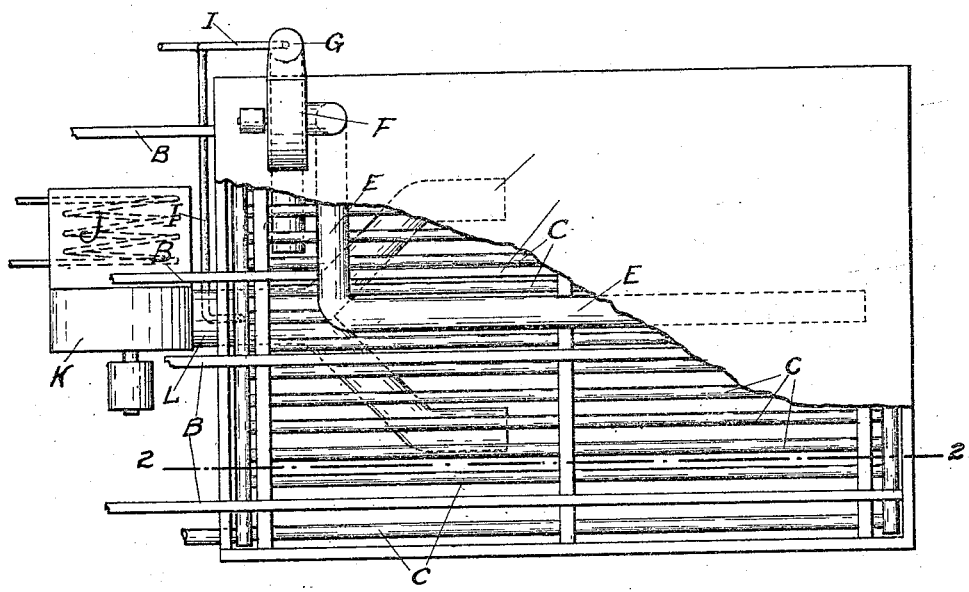
Figure 2:
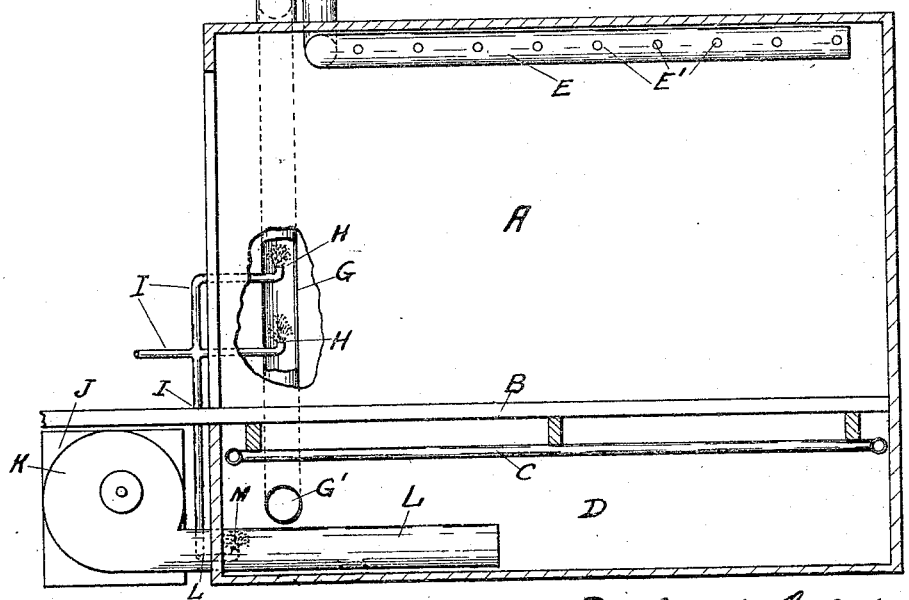

In the drawings,—Figure 1 is a top plan view of a drying kiln with a part of the top broken away; and Fig. 2 is a vertical sectional view on line 2—2, Fig. 1.

In the drawings A designates a drying chamber into which run two tracks, as B—B, to support the cars of lumber to be dried. Under these tracks, like a floor, is a series of spaced steam pipes, C, between and around which air passes upwardly from the chamber D below. A pipe E, in the upper part of the drying chamber A, is provided with a series of inlet openings E', and is connected at one end with a suction fan F, by means of which the air from the drying chamber is drawn out and forced through a down pipe G, on the outside of the housing, and from which it is discharged into the chamber D below, as indicated at G'. In this down pipe G are placed, one above the other, two or more spray nozzles, as H—H, connected with a water supply pipe I.

J designates a box containing steam pipes or radiators for heating the air which is drawn through it by means of a fan K, and forced into the lower chamber D, through the branches of a supply pipe L, leading from a position beneath the tracks B—B and the steam pipes C. In the pipe L is located another spray nozzle, as M, connected with the water pipe I. Thus the air is kept circulating up through the drying chamber A, down through the pipe G, and is kept supplied by the fan K. The moisture in the air, from the sprays, makes it possible to increase its temperature and thereby greatly increase the temperature of the drying chamber A without checking or cracking the lumber, as is the case where hot, dry air is forced through the drying chamber. The air comes directly in contact with the sprays of water in liquid form and thereby is made sufficiently moist so as to effectively operate as a drying medium without any of the objections heretofore experienced where the air is not passed through a constant spray of water during its circulation through the drying kiln. In other words, by bringing the air in direct contact with the water during its circulation through the kiln and through the steam pipes, the drying is effected with hot moist air instead of with hot dry air, and the sprays of water also act to cause a quick condensation of the moisture gathered from the lumber, or other matter being dried.

While I have shown and described the invention as used in connection with drying lumber, it is to be understood that it is equally applicable to drying fruit, vegetables and the like.

The invention has been thoroughly demonstrated as a drier for lumber and all kinds and widths of lumber have been quickly and most satisfactorily dried without any cracking or checking whatever.

I am aware that it is possible to make changes in the arrangement of the elements here shown for illustrating the invention without departing from the spirit thereof, and I do not, therefore, limit the invention except as I may be limited by the hereto appended claims.

I claim:

1. A drying apparatus comprising a housing having a drying chamber therein, said chamber provided with an air inlet, a fluid spray in said air inlet, means for forcibly feeding air through the air inlet, means for heating the air, and a conduit having its opposite ends in communication with the drying chamber, a water spray in said conduit, and means for causing a forced circulation of air through the conduit in the course of its travel through the drying chamber.

2. In a drying apparatus of the character described, a container for the material to be treated, an air supply adapted to discharge into the container, means for moistening the air prior to its discharge in the container, means for withdrawing the air from the container and for returning the same to the container independently of the admission of the fresh air to the latter, so as to commingle with the said fresh air, substantially as described.

3. In a drying apparatus of the character described, a container for the material to be treated, an air supply adapted to discharge into the container, means for moistening the air prior to its discharge into the container, means for withdrawing the air from the container and returning the same to the container independently of the admission of the fresh air to the latter, in combination with means for spraying the air withdrawn from the container with water prior to its return to the container, substantially as and for the purpose specified.

4. In a drying apparatus of the character described, a container for the material to be treated, an air supply adapted to discharge into the container, means for moistening the air prior to its discharge into the container, means for withdrawing the air from the container and returning the same to the container independently of the admission of the fresh air to the latter, in combination with means for condensing the moisture in the air withdrawn from the container prior to its return thereto, substantially as and for the purpose specified.

5. In a drying apparatus of the character described, a container for the material to be treated, an air supply adapted to be discharged into the container, means for withdrawing the air from the container and for returning the same to the container, and separate spray devices arranged to discharge water in both the path of admission and the path of return of the air to the container, substantially as and for the purpose described.

6. In a drying apparatus of the character described, a container for the material to be treated, an air supply adapted to discharge into the container, means for moistening the air prior to its discharge into the container, and means for withdrawing the air from the container and returning the same to the container independently of the admission of the fresh air to the latter so as to commingle with the fresh air, substantially as described.

7. In a drying apparatus of the character described, a container for the material to be treated, an air supply adapted to discharge into the container, means for withdrawing the air from the container and returning the same to the container independently of the admission of the fresh air to the latter in combination with means for spraying the air withdrawn from the container with water prior to its return to the container.

Signed at Portland, Oregon, this 1st day of December, 1913.

JOHN W. DALE.

In the presence of—
R. B. FRENCH,
WARREN P. SMITH.